(12) United States Patent
Tanimoto

(10) Patent No.: US 6,952,280 B1
(45) Date of Patent: Oct. 4, 2005

(54) NETWORK PRINTING APPARATUS

(75) Inventor: Yoshifumi Tanimoto, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 0 days.

(21) Appl. No.: 09/428,836

(22) Filed: Oct. 28, 1999

(30) Foreign Application Priority Data

Nov. 11, 1998 (JP) .................................. 10-320109

(51) Int. Cl.⁷ ............................................ G06F 15/00
(52) U.S. Cl. ...................... 358/1.15; 358/1.9; 358/2.1; 358/1.13; 358/1.16
(58) Field of Search .............................. 358/1.15, 1.9, 358/2.1, 1.13, 1.16, 434, 442

(56) References Cited

U.S. PATENT DOCUMENTS

| | | | |
|---|---|---|---|
| 5,982,994 A * | 11/1999 | Mori et al. ................ | 358/1.15 |
| 6,088,120 A * | 7/2000 | Shibusawa et al. ........ | 358/1.15 |
| 6,202,092 B1 * | 3/2001 | Takimoto .................... | 709/225 |
| 6,502,147 B2 * | 12/2002 | Reilly .......................... | 710/104 |
| 6,515,758 B2 * | 2/2003 | Uda et al. ................... | 358/1.15 |
| 6,614,546 B1 * | 9/2003 | Kurozasa .................... | 358/1.15 |

FOREIGN PATENT DOCUMENTS

JP   09-048165   2/1997

* cited by examiner

*Primary Examiner*—Twyler Lamb
(74) *Attorney, Agent, or Firm*—Hogan & Hartson, LLP

(57) ABSTRACT

A paper type dedicated for use only with jobs matching specifically designated criteria, such as a specific client and a specific job, is loaded into a network printer. Jobs not matching specifically designated criteria, such as jobs from non-designated clients or for non-designated jobs, are not printed out onto the specially loaded paper type. A user designates the client or job through a designating unit (3) inside the network printer (2). After designation, the client such as a personal computer generates a printing request, which is sent over the network (1) and received by the network printer (2). Upon reception, the printing unit (4) determines whether or not the received request matches the designating criteria. The printing unit (4) prints out only those jobs, which match the designating criteria.

12 Claims, 3 Drawing Sheets

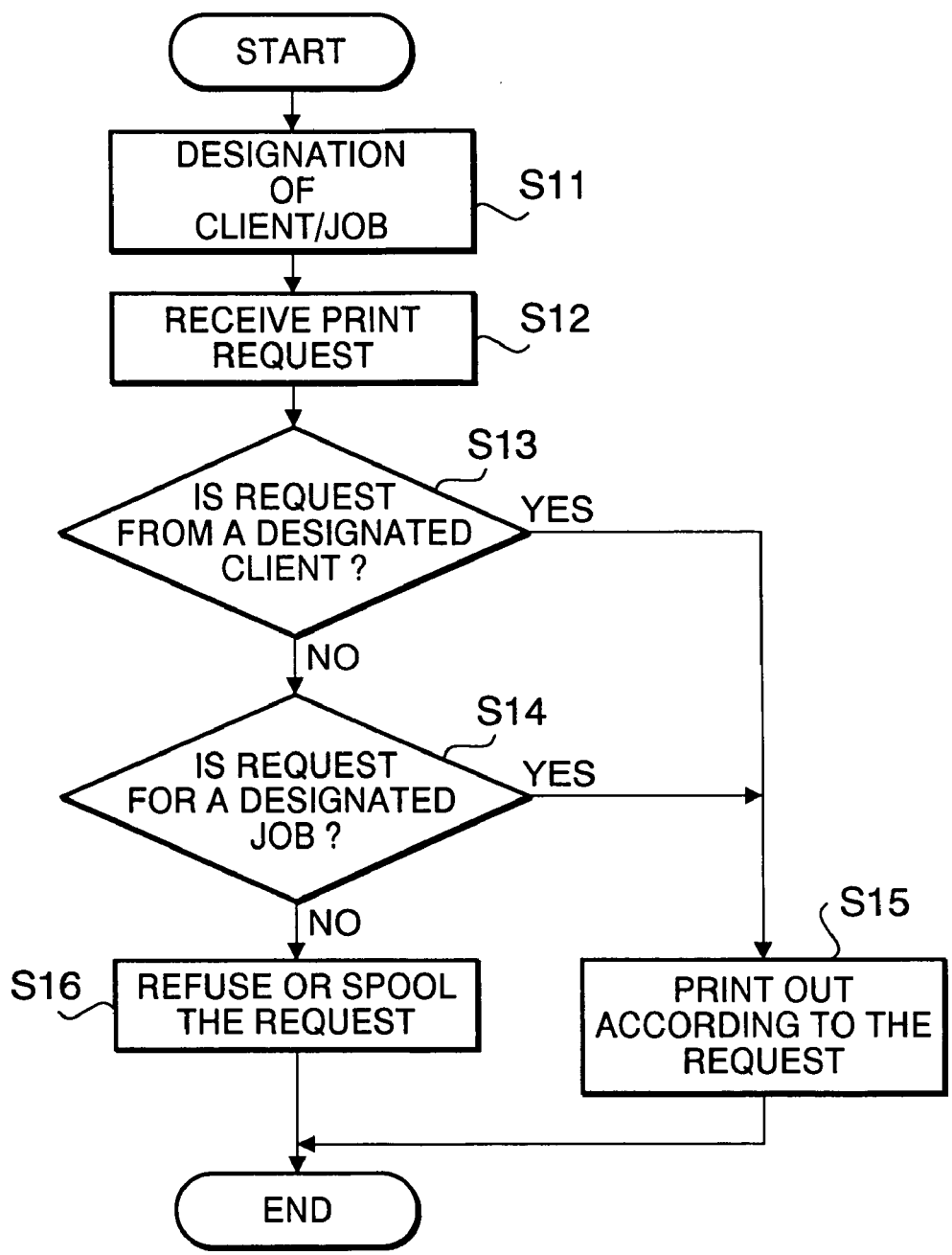

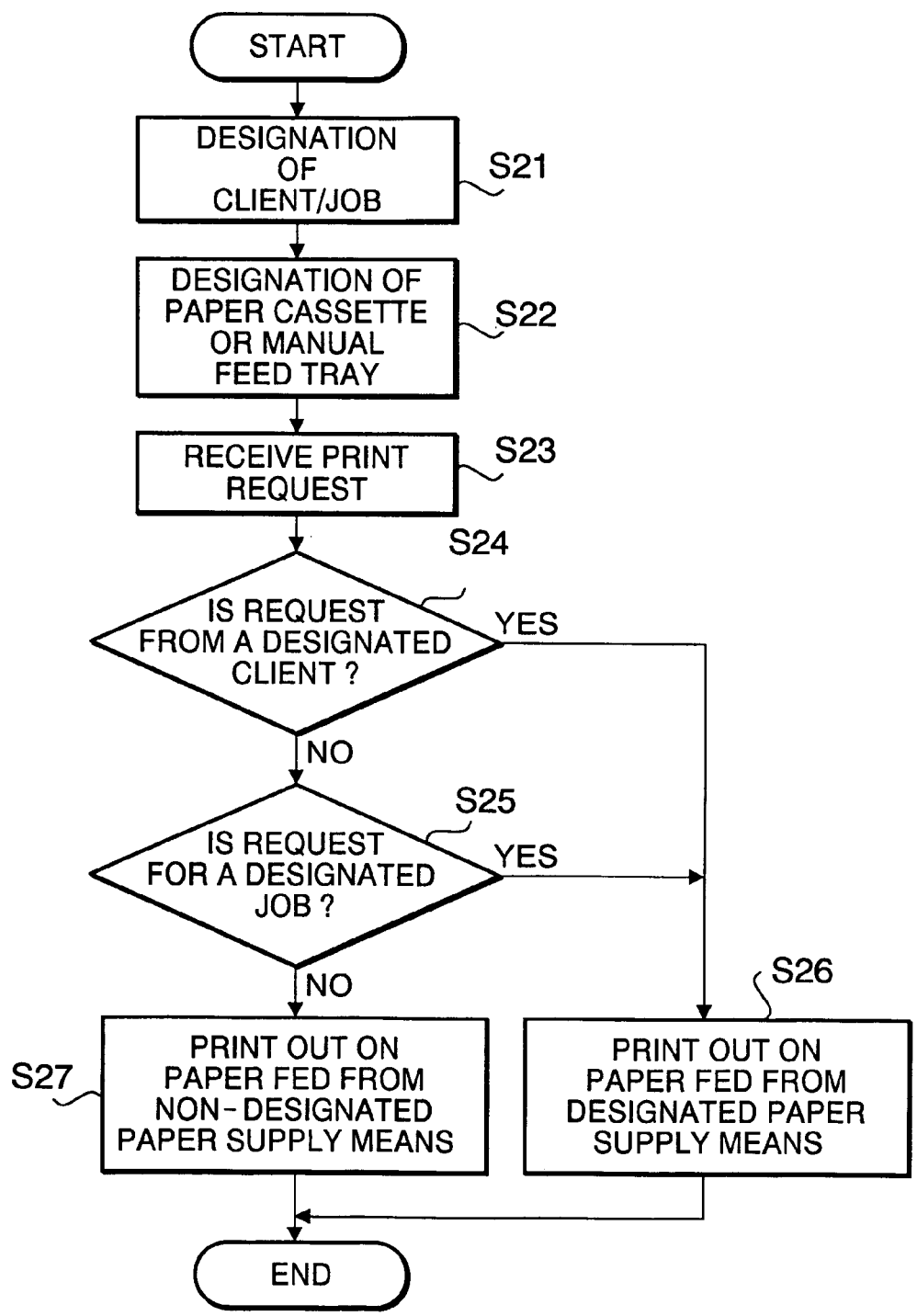

NETWORK PRINTING APPARATUS

BACKGROUND OF THE INVENTION

1. Field of the Invention

The present invention relates to a network printer which performs printing based on printing requests received from network-connected clients.

2. Description of the Related Art

Today, printers which connect to LANs or similar networks can typically receive a plurality of printing requests from a plurality of clients such as computers, faxes, and other devices connected to the network. When a plurality of competing printing requests are generated, these requests may be "spooled", and the printing order then determined based upon either the order in which the printing requests are received, the priority status of certain requests, or other factors.

However, since the network printer is shared by many users, individual users cannot print from the network printer using special kinds of paper (colored paper, transparent paper for over head projectors, or the second side of a printed sheet, for example) not normally used by the other network users. If an individual user does load a non-standard paper into the printer to receive and print data from a particular client, that paper will also be used for printing data sent by other clients on the network. Of course, this problem is not limited to paper of special material, but is a problem of network printers encountered by users who want to print onto a sheet of a size not normally loaded in the printer, or occasionally faced by users who want to print in an alignment (landscape vs. portrait, for example) other than the one in which the printer normally prints.

SUMMARY OF THE INVENTION

In order to solve these difficulties of conventional network printers, it is an object of the present invention to provide a network printer which can be loaded with paper used exclusively for a particular (or designated) client or for a particular job and perform the printing on such exclusive-use paper when a request for printing is received from such a client or for such a job.

Another object of the present invention is to provide a network printer that can prevent other clients or jobs from being bothered or adversely influenced by loading of and printing on such exclusive-use paper.

According to one aspect of the present invention, there is provided a network printer of a type which is connected to a network and performs printing according to printing requests from network-connected clients, the network printer including a means for designating a client who is allowed to use the network printer or a job to be performed by the network printer, and a printer means for only accepting a printing request from the designated client or for the designated job and performing the printing according to the accepted printing request. Thus, the network printer of the present invention can be dedicated for the designated client or job, and can then exclude all other clients or jobs. This facilitates usage of specialty papers or papers of sizes not normally used by the network printer. Additionally, since printing is not performed for non-designated clients and jobs, non-designated clients and jobs will not end up printing out onto the non-standard paper.

According to another aspect of the present invention, there is provided a network printer which is connected to a network and performs printing according to printing requests from network-connected clients, the network printer including a plurality of paper supply means, a designating means for designating at lease one client or job for at least one of the plurality of paper supply means in such a manner that one paper supply means is dedicated for one client or job, and a printing means for only accepting the printing requests from the clients or for the jobs designated by the designating means and performing printing operations on recording sheets supplied from the paper supply means dedicated for such clients or jobs. This allows a particular paper supply means to be used for printing only by designated clients or only for designated jobs, thereby allowing for both special paper and regular paper to be loaded in the same network printer, and allowing the printer to print for both designated clients or jobs as well as for non-designated clients and jobs. Since paper supply means dedicated for use by designated clients or for designated jobs are not used for non-dedicated clients or jobs, the jobs of non-designated users or non-designated jobs will not be printed out onto non-standard paper. The plurality of paper supply means may include a manual feed tray.

In yet another aspect of the present invention, a network printer of the present invention adapted to print an image on a recording sheet according requests from clients includes a plurality of paper supply means of which at least two are capable of being loaded with different paper types, such as papers of different sizes or alignments (portrait or landscape mode, for example), a means for designating a particular client or job that is allowed to use a particular paper type, and a printing means for only accepting printing requests from the clients or for the jobs designated by the designating means and conducting printing operations on the respective paper type. Thus, particular types of paper such as particular sizes or positional arrangements can be dedicated for use by certain designated clients or for certain designated jobs. In short, the network printer can process the printing requests received from designated clients or for designated jobs using a printing supply means dedicated for use with the designated client or job. This then prevents designated printing operations from interfering with normal printing requests from non-designated clients and for non-designated jobs when non-standard paper types are designated. Non-designated clients and non-designated jobs then do not get unexpectedly printed onto the non-standard paper types.

BRIEF DESCRIPTION OF THE DRAWINGS

FIG. 2 is a flow-chart showing an example of the operations performed by the network printer shown in FIG. 1 when a printing request is received after designation of a client or job.

FIG. 4 is a flow chart showing an example of the operations performed by the network printer shown in FIG. 3 when a printing request is received after designation of a client or job.

DETAILED DESCRIPTION OF THE INVENTION

Embodiments of the present invention will now be described in reference to the attached drawings.

Figure 1:
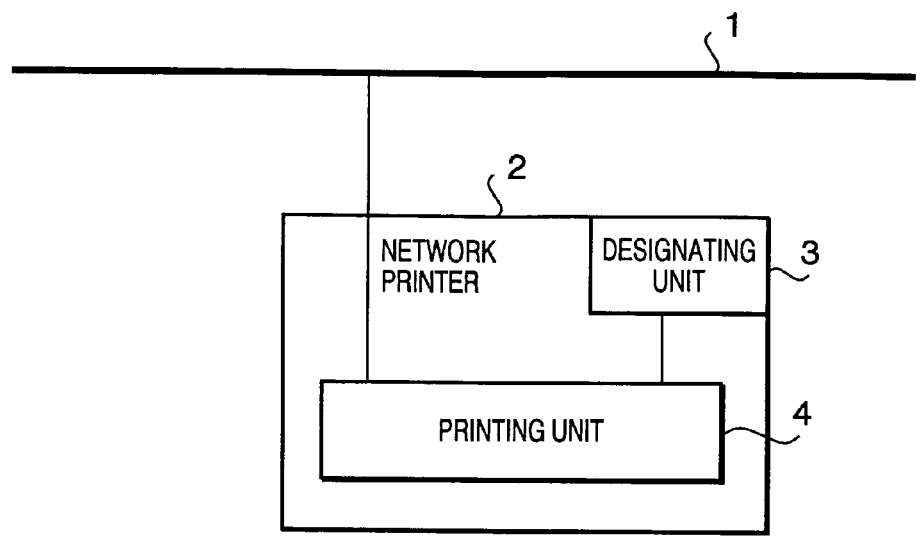
FIG. 1 is a block diagram showing a first embodiment of a network printer according to the present invention.

Referring to FIG. 1, illustrated is a network printer 2 of this embodiment, which is connected to a network 1. The network printer 2 includes a designating unit 3 and a printing unit 4. The network 1 may be a LAN or the like, and is connected to not only the network printer 2 but also other devices. The other devices, including computers and facsimile machines, act as clients, sending printing requests to the network printer 2. The network printer 2 receives the requests from the clients, and then performs printing according to the requests.

The designating unit 3 may designate either a client who will be allowed to use the network printer 2 or a job to be performed by the network printer 2. A client may be specified by any information specific to that client, such as its IP address, user address, or the like. A job may be specified by information specific to that job, such as a job number or the like received along with the printing request from the client. Alternatively, a user ID or user address may be used for specification.

The printing unit 4 receives a printing request sent over the network 1 from a client (not shown in the diagrams), and prints out an image onto a recording sheet according to the specifications of the received printing request. If, when a request is received, there is a particular client or job that is designated by the designating unit 3, information about the client who has sent the printing request or job (designating criteria) is examined to see if it matches the designating criteria designated by the designating unit 3. Printing is performed according to the received request only if the printing request is from the designated client or for the designated job. Moreover, in the present embodiment, printing requests from non-designated clients or for non-designated jobs are either refused or are spooled and printed after the designations have been removed.

FIG. 2 is a flow chart showing an example of the operation of the network printer 2 shown in FIG. 1 when a client or job has been designated. At step S11, a user designates either a client or a job using the designating unit 3 by, for example, inputting a user ID or user address. Next, the user generates a printing request from a client. This means that the user operates the client such as a personal computer to send a printing request.

At step S12, the network printer 2 receives the printing request transmitted over the network 1. At step S13, the printing unit 4 determines whether or not the received printing request is a request from the same client as that designated at step S11. If the request has been generated by a client other than one that has been designated at step S11, or if no client has been designated at step S11, the program proceeds to step S14, where it is determined whether or not the job specified by the request is the same as that designated at step S11.

If at step S13 it is determined that the received printing request is from a designated client, or if at step S14 it is determined that the received printing is for a designated job, then at step S15, the request is processed and an image according to the request is printed out. If, however, the received printing request is neither from a designed client nor for a designated job, then at step S16, the printing request is refused, or spooled and will be processed when the client/job designation is removed from the designating unit 3.

According to the present embodiment, a user can enable the network printer 2 to accept and process only printing requests from designated clients or for designated jobs. Thus, a user can temporarily load into the printer 2 and perform printing with specialty papers, papers of sizes not normally used with the printer, or papers in different alignments. Furthermore, printing requests received from non-designated clients or for non-designated jobs are not performed, and thus do not interfere with the performance of the user's designated jobs. Still further, non-designated jobs and jobs of non-designated clients are not unexpectedly printed out onto the non-standard papers.

Figure 3:
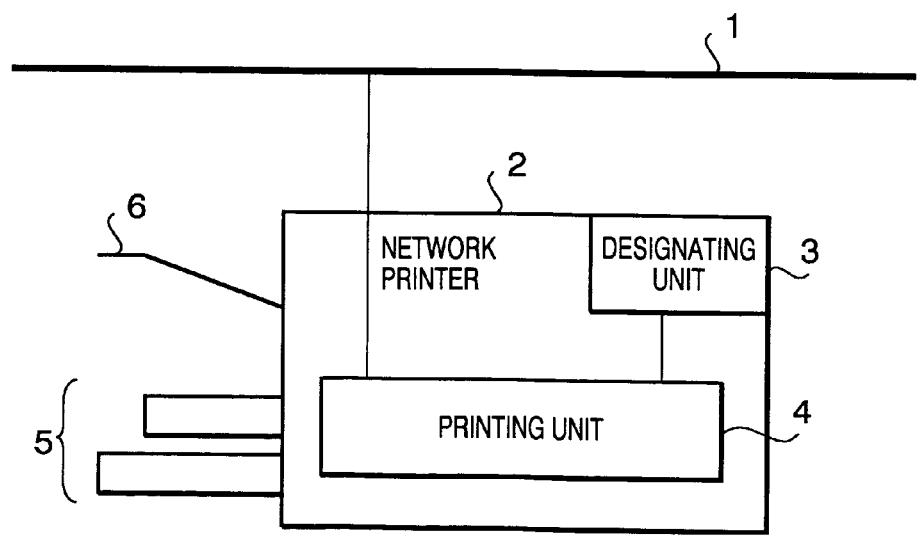
FIG. 3 is a block diagram showing a second embodiment of the network printer according to the present invention.

FIG. 3 is a block diagram showing a second embodiment of the network printer of the present invention. Elements which FIG. 3 shares in common with FIG. 1 have been given the same reference numbers, and description of these elements is now omitted. In the present embodiment, the network printer 2 is provided with a plurality of paper supply means 5 and 6. Specifically, reference numeral 5 indicates a plurality of paper cassettes, and 6 indicates a manual input tray. Users are thus able to use the plurality of paper supply means to print out onto a variety of different types of paper, including papers of different sizes, proportions, or material characteristics. It should be clear to those skilled in the art, however, that the present embodiment could be practiced even if the manual feed tray 6 was eliminated, or alternatively, if the manual feed tray 6 was employed with only one paper cassette 5. It should also be noted that additional manual feed trays 6 may also be employed.

The user can use the designating unit 3 to designate any one of the paper cassettes 5 and manual feed tray 6 to be used for printing, and a client who is allowed to use the designated paper cassette/tray, or a job to be performed by the designated paper cassette/tray. Moreover, designation may be made in such a manner that just one of the cassettes 5 and tray 6 is designated in connection with a certain client, or a plurality of paper supply units 5, 6 are designated in connection with a plurality of clients respectively.

If a particular client or job has been designated by the designating unit 3, the printing unit 4 then checks an incoming print request to see if the request is generated from the same client as that designated by the designating unit 3 or for the same job as that designated. If a received print request is from a designated client or for a designated job, then the designated paper cassette 5 or manual feed tray 6 will be selected for printing, and the paper loaded therein will be used for printing. If, on the other hand, a received printing request is from an non-designated client and for a non-designated job, then a paper cassette 5 or manual feed tray 6 not dedicated to the designated client or for the designated job will be selected for printing, and the paper loaded in the undedicated paper supply means will be used for printing. If there is no paper cassette 5 or manual feed tray 6 that is not dedicated for use by a designated client or for a designated job, or even if there is such a paper supply unit present but it is of a different size than the requested job, then the printing request can either be spooled or rejected.

FIG. 4 is a flow chart showing an example of the operation conducted by the network printer 2 shown in FIG. 3 when a client or job has been designated. At step S21, using the designating unit 3, a user designates either a client or a job for which non-standard paper will be used for printing. As previously mentioned, the user may do so by inputting a user ID or user address, or the like. It should be noted here that a plurality of clients or jobs may be designated at step S21. Next, at step S22, a paper supply cassette (or cassettes) 5 or manual feed tray(s) 6 is (are) dedicated for use with the client(s) or job(s) designated at step S21. After completing these steps, the user then generates a print request from the client.

At step S23 the network printer 2 receives a printing request transmitted over the network 1 from a remote client. At step S24, the printing unit 4 determines whether or not the printing request received at step S23 is a request from the client that has been designated at step S21 (or a request from one of the clients designated at step S21 if a plurality of clients have been designated). If the request is from a client that was not designated at step S21, or if a client has not been designated at step S21, then the program proceeds to step S25, and it is determined whether or not the printing request is of a job designated at step S21.

If, however, it is determined at step S24 that the received printing request is from a designated client, then the program proceeds to step S26, where the request is processed and the printing is carried out according to the request. This printing is made on the paper fed from the designated paper supply means (either one of the paper cassettes 5 or the manual feed tray 6) that was designated for use with that client at step S22. If it is determined at step S25 that the received printing request is for a designated job, then the program also proceeds to step S26, where the printing is conducted according to the request. As in the case of a request from a designated client, an image will be printed out onto the paper fed from the designated paper supply means designated for use with that job at step S22.

If the print request received at step S23 is for neither a designated client nor job so designated at step S21, then the program proceeds to step S27, and the printing will be performed the paper fed from a paper supply means (one of the paper cassettes 5 and manual feed tray 6) not dedicated for use with a designated client or job. This recording paper is a normal one.

It would be expected that the network printer 2 normally prints out onto the paper stored in the paper cassettes 5. However, when the user uses specialty paper, a paper size not normally used by the printer, or prints out in a direction in which the printer does not normally print, the user can load the desired paper into the manual feed tray 6. Alternatively, the user may replace one of the paper cassettes 5 with a special paper supply cassette when the network printer 2 is equipped with more than one paper supply cassettes 5. Thus, the user can dedicate either the manual feed tray 6 or a paper cassette 5 holding the specialty paper for use with a designated client or for a designated job using designating unit 3, thus enabling printing onto paper not normally used with the network printer 2.

Since a printing request received from a different client, or a job request received for a different job, is not printed out onto the irregular paper, the user performing designated printing does not interfere with the normal operation of the network printer, and printing requests from other clients and for other jobs can continue to be processed and printed as normal. In other words, the data from non-designated clients and non-designated jobs are not unexpectedly printed out onto the non-standard paper, but are processed and printed as they would normally be processed and printed without special designation.

It should be noted that it is also possible to comprise the present invention such that printing for all clients and jobs are performed by a paper supply cassette 5 or manual feed tray 6 not dedicated for particular clients or jobs. For example, if the received printing request is from a designated client, and a particular paper cassette 5 or manual feed tray 6 is designated for use with that printing request, the designation of designating unit 3 can be ignored, and regular print processing can be performed.

The above-described second embodiment of the present invention has been described such that a paper cassette 5 or manual feed tray 6 is dedicated for use with a designated client or job. It should be noted, however, that at step S22 of FIG. 4, a particular type of paper can be designated in lieu of the type of paper supply means (paper cassette 5 or manual feed tray 6). The paper type information may include the paper size, the printing alignment (vertical or horizontal), the paper material, or the like. The printing unit 4 first determines the type of paper loaded into the paper cassette 5 or manual feed tray 6 and then receives a printing request from a designated client or for a designated job. The printing unit 4 can therefore select the designated paper type corresponding to a particular client or job when it processes the printing request. The designated paper can be loaded into either a paper cassette 5 or the manual feed tray 6, and non-designated clients and jobs can be prevented from printing out onto the designated paper. This then allows a particular paper size or printing alignment to be dedicated for use with a designated client or job.

As a specific example, when B4, A4, and B5 are loaded into the printer 2, and a user designates a client and B5 paper (of course, the user could alternatively select B4 or A4 paper size) for use with this client, only a printing request received from the designated client is allowed to be printed onto the B5 paper. Other clients cannot utilize the B5 paper, but instead the B4 or A4 paper.

The illustrated and described network printer is disclosed in Japanese Patent Application No. 10-320190 filed in Japan on Nov. 11, 1998, the subject application claims priority of this Japanese Patent Application, and the entire disclosure thereof is incorporated herein by reference.

What is claimed is:

1. A network printer which is connected to a network and performs printing based on printing requests from clients also connected to the network, the network printer comprising:

a plurality of paper supply means;

designating means for designating at least one client or job for at least one of the plurality of paper supply means such that one paper supply means is dedicated for one client or job; and printing means for accepting only printing requests from the client(s) or for the job(s) designated by the designating means, and for performing printing according to the accepted request(s) using the respective dedicated paper supply means, wherein designation of the at least one client or job for the paper supply means is completed before requesting the printing job.

2. The network printer of claim 1, wherein the plurality of paper supply means includes a manual feed tray.

3. The network printer of claim 1 further including means for spooling printing requests from non-designated clients or for non-designated jobs until designation by the designation means is removed.

4. The network printer of claim 1 further including means for refusing printing requests from non-designated clients or for non-designated jobs.

5. A network printer which is connected to a network and performs printing based on printing requests received from clients connected to the network, the network printer comprising:

a plurality of paper supply means which are capable of holding different types of paper, the type including at least paper size and paper alignment;

designating means for designating at least one of clients or jobs for at least one of the plurality of paper supply means such that one paper supply means is dedicated for one client or job; and printing means for accepting only printing requests from the client(s) or job(s) designated by the designating means, and for performing printing on recording sheets supplied from the paper supply means dedicated therefor, wherein designation of the at least one client or job for at least one of the plurality of paper supply means is completed before requesting the printing job.

6. The network printer of claim 5, wherein the plurality of paper supply means includes a manual feed tray.

7. The network printer of claim 5 further including means for spooling printing requests from non-designated clients or for non-designated jobs until designation by the designation means is removed.

8. The network printer of claim 5 further including means for refusing printing requests from non-designated clients or for non-designated jobs.

9. A network printer responsive to print requests from clients connected to a network, comprising:
  a plurality of paper supplies;
  means for dedicating at least one of said paper supplies for a print job of a particular client based on a request from said particular client,
  wherein printing from the paper supply dedicated to the particular client is reserved for a period of time such that others of said clients are prevented from executing print jobs using the dedicated paper supply during the period of time and
  wherein designation of said particular client for at least one of said paper supplies is completed before requesting the print job.

10. A network printer of claim 9, wherein the particular client is permitted to perform a plurality of print jobs using the dedicated paper supply such that printing from the paper supply dedicated to the particular client is reserved for a plurality of time periods.

11. A network printer of claim 9, wherein the reservation of the dedicated paper supply by the particular client is terminated once the printing job of the particular client ends.

12. A network printer of claim 9, wherein the reservation of the dedicated paper supply by the particular client is terminable by the particular client.

* * * * *